United States Patent [19]
Hoff, Jr.

[11] 3,831,015
[45] Aug. 20, 1974

[54] SYSTEM FOR GENERATING A MULTIPLICITY OF FREQUENCIES FROM A SINGLE REFERENCE FREQUENCY

[75] Inventor: Marcian E. Hoff, Jr., Mountain View, Calif.

[73] Assignee: Intel Corporation, Santa Clara, Calif.

[22] Filed: June 8, 1972

[21] Appl. No.: 261,054

[52] U.S. Cl. .................... 235/197, 84/1.01, 235/152
[51] Int. Cl. .................... G06f 15/34
[58] Field of Search ...... 235/197, 152; 340/347 DA, 340/165, 172.5; 328/13, 14, 142, 165, 181, 185–187; 307/227, 228; 84/1.01, 1.03, 1.13; 179/90 K, 1 M

[56] References Cited

UNITED STATES PATENTS

| | | | |
|---|---|---|---|
| 3,515,792 | 6/1970 | Deutsch | 84/1.03 |
| 3,526,724 | 9/1970 | Gasser | 179/90 K |
| 3,633,017 | 1/1972 | Crooke et al. | 235/197 X |
| 3,654,450 | 4/1972 | Webb | 235/197 |
| 3,657,657 | 4/1972 | Jefferson | 328/14 |
| 3,689,914 | 9/1972 | Butler | 235/197 X |

*Primary Examiner*—Joseph F. Ruggiero
*Attorney, Agent, or Firm*—Spensley, Horn & Lubitz

[57] ABSTRACT

A digital system which enables the generation of frequencies, including frequencies which are not submultiples of a reference frequency is disclosed. A predetermined number K is periodically added at the rate of $f_c$ to the contents of an N bit register which is permitted to overflow when its content exceeds its capacity. Any frequency equal to $Kf_c/2^N$ may be generated by the system.

6 Claims, 4 Drawing Figures

PATENTED AUG 20 1974 3,831,015

SHEET 2 OF 2

SYSTEM FOR GENERATING A MULTIPLICITY OF FREQUENCIES FROM A SINGLE REFERENCE FREQUENCY

BACKGROUND OF THE INVENTION

I. Field of the Invention

The invention relates to the field of digital means for generating periodic functions.

II. Prior Art

In the prior art master clocks, which are often crystal controlled, are used for generating timing signals in countless digital devices such as computers. Typically, the frequency of the crystal controlled oscillator is divided by some integer to obtain a desirable frequency. Since multiplication of a frequency by a number is difficult there are practical limitation on the frequencies that may be derived from a single reference frequency. For example, if the reference frequency is 500 KHZ it is impractical to produce timing signals of 110 KHZ or countless other frequencies.

With the present invention a digital circuit is disclosed which permits the generation of frequencies which are not necessarily submultiples of a reference frequency. The output from the circuit may be a sawtooth wave at the desired frequency. The sawtooth output permits the easy generation of a plurality of different waveforms by use of a read-only-memory.

SUMMARY OF THE INVENTION

A system for digitally generating a multiplicity of frequencies from a single reference is described. In the presently preferred embodiment a crystal oscillator is utilized to generate a reference frequency referred to as $f_c$. A digital number K is repeatedly added to the contents of an N bit digital register at the frequency of $f_c$. The register is allowed to overflow such that the most significant bits in the register are lost; the lesser significant bits remain within the register after an overflow. The rate at which the overflow occurs from the register is represented by the term $Kf_c/2^N$. Thus, by the proper selection of K, N and $f_c$ a multiplicity of frequencies may be generated including frequencies which are not submultiples of $f_c$. In the presently preferred embodiment the contents of the register are coupled to a read-only-memory and serve as addresses for determining values of sinusodial functions. The output from the read-only-memory is converted to an analog signal by a digital-to-analog converter.

DETAILED DESCRIPTION OF THE INVENTION

Figure 1:
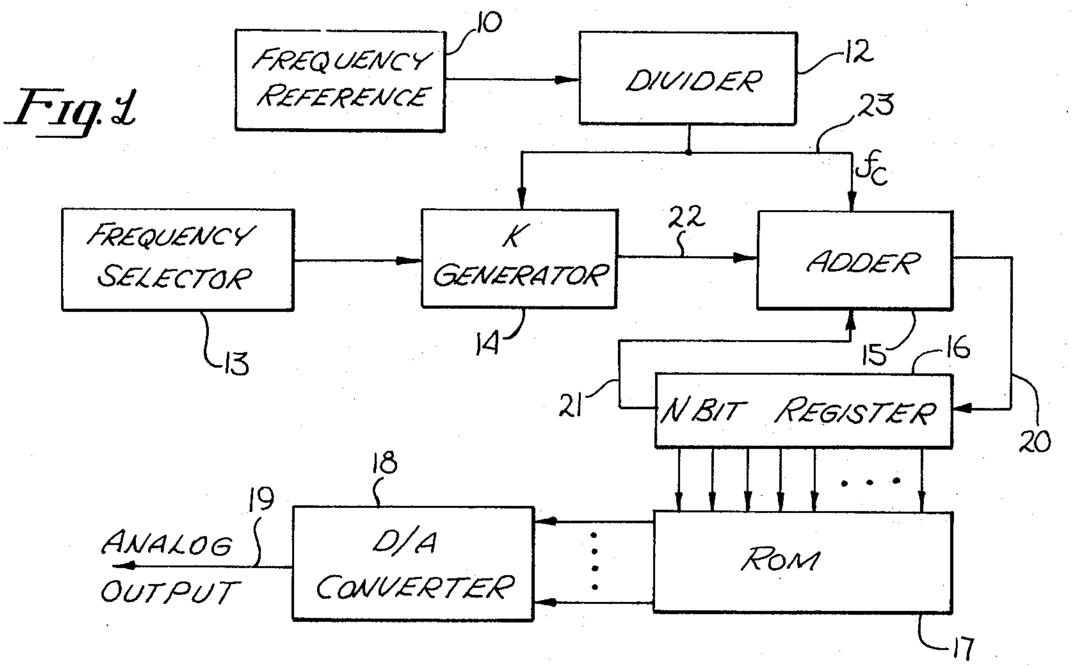
FIG. 1 is a block diagram illustrating in general terms how the analog output signal which may or may not be a submultiple of a reference signal is generated from a reference signal.

Referring first to FIG. 1, the circuit shown generates an output analog signal on lead 19, this output signal being a function of a reference frequency generated by the frequency reference means 10. Frequency reference means 10 may be any oscillator such as a crystal oscillator or other means for generating a reference frequency. The output from frequency reference means 10 is coupled to a divider 12 which divides the output from the frequency reference to a desired frequency. Divider 12 may be any one of numerous digital circuits utilized for dividing. For the purpose of explanation herein the output from divider 12 is referred to as $f_c$. The divider 12 is not needed in all embodiments, although it is particularly useful where multiple frequencies are generated such as in the embodiment of FIG. 3.

Frequency selector 13 may comprise any means for selecting a signal frequency or a plurality of frequencies. For example, frequency selector 13 may comprise an ordinary keyboard such as the keyboards utilized on push button telephones or the keyboard associated with a musical instrument.

The output from the frequency selector 13 is coupled to a K generator 14. The purpose of the K generator is to generate a digital number K which bears a relationship to the frequency selected on frequency selector 13 in accordance with an equation set forth herein. K generator 14 may be a read-only-memory (ROM) or a plurality of gates which provide a digital output signal representative of a number K.

Adder 15 may be an ordinary digital circuit utilized for adding two numbers and for producing an output digital signal representative of the sum of the two quantities. Adder 15 specifically adds the number K generated by the K generator 14, and which is coupled to the adder 15 by lead 22, to the number in the N bit register 16 which is coupled to adder 15 by lead 21. The sum of the numbers coupled to adder 15 by leads 21 and 22 is fed into the N bit register 16 by lead 20. The N bit register 16 may be any one of numerous register means known in the art. As will be seen the function of the adder 15 and the N bit register 16 is to operate as an accumulation means which has a finite capacity N and which accumulates the results of successive additions.

In the presently preferred embodiment the contents of the N bit register 16 are coupled to a read-only-memory 17 and after the contents of the N bit register have been properly decoded, the contents serve as addressess for selecting output information from the ROM 17 such as values needed to construct sinusodial functions. The output from the ROM 17 is coupled to digital-to-analog converter 18 which converts the digital output signals from the ROM 17 to an analog form. It will be apparent from the explanation which follows that not all the bits in the N bit register 16 need be utilized for addressing ROM 17 and in fact any number of the more significant bits in register 16 may be utilized for this purpose.

The circuit of FIG. 1 particularly divider 12, K generator 14, adder 15, register 16, and ROM 17, may be fabricated on a single chip utilizing known MOS technology. In such an implemenatation the N bit register 16 may comprise a dynamic memory while the K generator 14 and the ROM 17 may comprise read-only-memories.

In the circuit of FIG. 1 the signal from divider 12, $f_c$, is utilized as a timing signal and determines the rate at which the adder 15 will add the quantity K to the contents of the N bit register 16. Thus, each time a signal is received on lead 23 the adder 15 adds the quantity K to the contents of the N bit register 16 and the new sum is returned to register 16 via lead 20. When the result of any addition exceeds N bits, the most significant bit which exceeds N bits is allowed to overflow from the N bit register and hence is lost.

Figure 2:
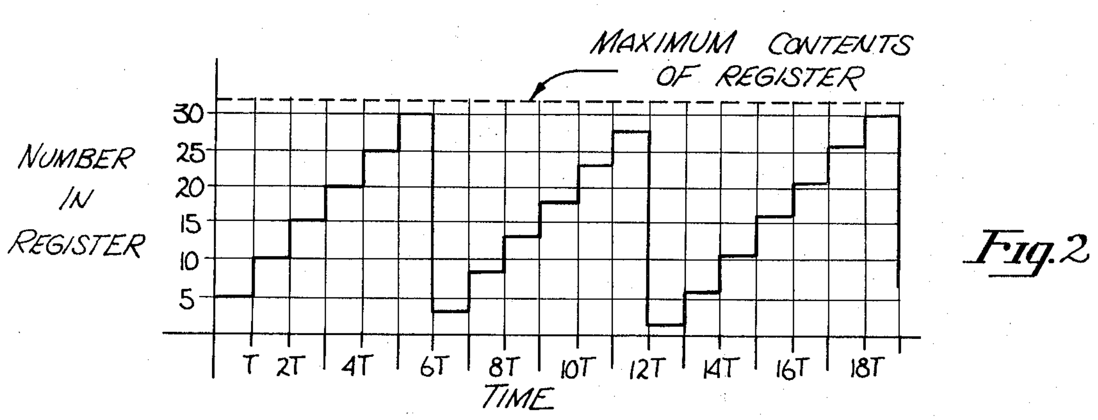
FIG. 2 is a graph which is used to illustrate the method in which the circuit of FIG. 1 operates.

An understanding of the operation of the circuit of FIG. 1 and the significance of the recycling of the register 16 may best be understood in conjunction with the graph of FIG. 2. Referring to the graph of FIG. 2 the ordinate represents the number in the register 16 while the abscissa represents time shown as periods of the signal $f_c$. For the purposes of explanation, it will be assumed that the K generator generates the number 5 represented digitally by 101 and that the N bit register has the capacity for holding 5 bits. Thus, for the purposes of explanation K is equal to 5 and N is equal to 5. Assume initially that the N bit register contains all zeros, as will be seen this is not necessary although convenient for the purposes of explanation. Upon receipt of a signal from divider 12 at time T, adder 15 adds the number 5 to the contents of the N bit register (0). The result of the addition (5) is shown on the graph of FIG. 2 between the timer T and 2T.

Upon receipt of the next signal on lead 23 the number 5 is again added to the contents of the register 16 resulting in the number 10 as shown in the graph of FIG. 2. The addition of the number 5 to the number of the register continues periodically, at the rate $f_c$, as shown in the graph of FIG. 2 until the number 30 is stored in register 16. When next the number 5 is added to the contents of the register the resultant sum in terms of a digital number is 100,011(35). This digital number contains 6 bits and since the capacity of register 16 has been assumed to be 5 bits when this digital number is communicated to register 16 via lead 20 the most significant bit is dropped. Thus, the contents of the register will become 00,011 or a number equivalent to 3 as shown in the graph at time 6T. The process continues with the addition of 5 to the contents of the register, a numerical 3, resulting in the number 8 and continues until the contents of the register equals 28. When next the number 5 is added to the contents of the register the resultant number 33 is beyond the capacity of the register and after the most significant bit overflows or is lost the register will contain a binary 1 in the least significant position, this being equivalent to a numerical one. This process continues each time the register overflows, the most significant bit is lost and the register again recycles until an overflow condition is reached. As illustrated in the graph of FIG. 2 the resultant waveform resembles a sawtooth wave. Note that for the example shown, after 32T, five overflows or sawtooth cycles will have occurred and the contents of register 16 will again be zero. In general, *K* overflows will occur in any period of $2^N$ cycles of $f_c$. Significantly, the contents of the register have an ever increasing value throughout each cycle. Thus, the contents of the register or at least those bits in the register of a greater significance may be decoded and utilized to address a read-only-memory. The read-only-memory may be used to generate values corresponding to any desired waveform such as a sinusodial waveform.

In an application where the register 16 has a greater capacity than 5 bits (e.g., 20 bits) and where K is a relatively small number, the sawtooth waveform of FIG. 2 would include many more increments and hence the output of the register 16 when coupled to a read-only-memory could result in a well defined output function from the memory. Functions other than a sinusodial function may be stored within a ROM 17, for example, in certain applications where it is desirable to duplicate a musical tone, the output from the register 16 when applied to ROM 17 may result in a fundamental sinusodial waveform plus predetermined harmonics of the fundamental waveform.

It may be readily seen that for the circuit of FIG. 1 the average frequency at which the N bit register 16 overflows is exactly given by the formula $f = Kf_c/2^N$. Where $f_c$ is the rate at which the quantity K is added to the number in the N bit register 16 by adder 15. Thus, by the proper selection of $f_c$, *N* and *K*, countless frequencies may be generated. By way of examples, if $f_c$ is equal to 100 KHZ and N is equal to 20, any frequency may be generated to an accuracy of 0.1 HZ or less. In some applications, it may be desirable to vary K, as a function of time, for example, $K_1$ may be added to the contents of register 16 during time T, then $K_2$ may be added to the contents of the same register at time 2 T. This results in an unusual output waveform which may be utilized in synthesizing unusual sounds or used for encoding data by frequency shift keying.

Figure 3:
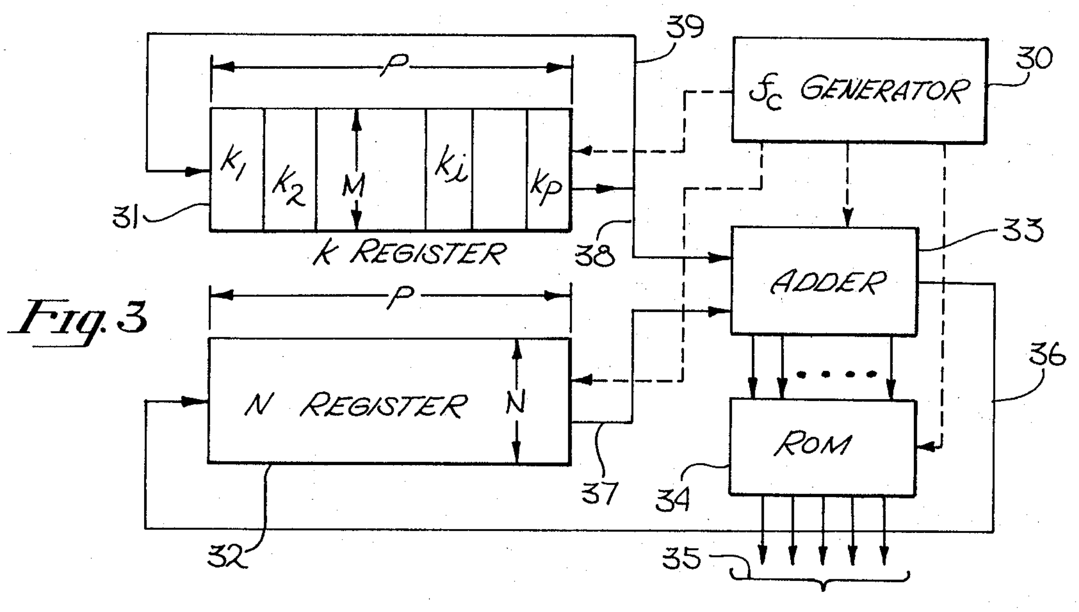
FIG. 3 is a block diagram which illustrates a circuit for generating a plurality of signals which are based on a single reference signal $f_c$ wherein a single adder is utilized.

Referring to FIG. 3 an alternate embodiment of the circuit of FIG. 1 is illustrated. In this embodiment, P (a real finite number), different frequencies are simultaneously generated from a single reference frequency, $f_R$, with only a single adder being used. As in the case of FIG. 1, the circuit of FIG. 3 includes a reference generator, $f_c$ generator 30, which may be a crystal oscillator or other frequency generation means. In the embodiment of FIG. 3, it will be assumed that $f_c$ is the output of a crystal oscillator that has been divided by P, hence $f_c$ equals $f_R/P$. The K generator 14 of FIG. 1 is illustrated as K register 31 which has the ability to store P numbers, $K_1$ through $K_P$. Each of these numbers may include any number of bits, such as M bits. Register 32 performs the function of storing the result of each addition and has the capacity to store P number of words, where each word has a maximum of N bits. Thus, both registers 31 and 32 store the same number of words although each register set may include a different number of bits per word.

Adder 33, which is an ordinary digital adding circuit, receives two digital words, one on lead 37 and one on lead 38 and adds the words, the sum of the words is stored in register 32 and is communicated to that register from adder 33 and lead 36. An N bit register similar to register 16 of FIG. 1 is included within adder 33 in the embodiment of FIG. 3, and the contents of this register are communicated to ROM 34 in the same way the contents of register 16 are communicated to ROM 17 of FIG. 1. The output of ROM 34 may be utilized to generate an analog signal by coupling leads 35 to a digital to analog converter.

The K register 31 produces P number of predetermined words $K_1$ through $K_P$, each representing a number and communicates these words sequentially to adder 33; additionally, these words are returned to the register on lead 39 so that they may again be sequentially added within adder 33. Register 32 receives the result of each addition from adder 33 and these sums are shifted P times within this register before being communicated back to adder 33. Thus, each value $K_i$, where $i = 1, 2 \ldots P$, from register 31, has a corresponding $N_i$ in register 32. Every $P^{th}$ cycle of $f_R$, $K_i$ will be added to its corresponding $N_i$. Hence, each location within register 32 will operate in the same manner as register 16 of FIG. 1 and generate a sawtooth waveform having a frequency equal to $K_i f_R/2^N P$ or $K_i f_c/2^N$. By way of example, assume that upon command from generator 30 the $K_{P-1}$ word is supplied to adder 33 from register 31 and simultaneously a word $N_{P-1}$ is also communicated to adder 33 from register 32. In adder 33 the two digital words are added and in a register similar to register 16 of FIG. 1 the results of this addition are communicated to ROM 34. If the results of this addition are a digital word having greater than N bits, the number of bits greater than N is allowed to overflow as in the case of the circuit of FIG. 1. The results of the addition after the overflow, if any, are returned to register 32 via lead 36, and also, the predetermined number $K_{P-1}$ is returned via lead 39 to register 31. This assumes that register 31 is an ordinary shift register. If a ROM or other memory with a non-destructive read-out is used in lieu of register 31, a return lead such as lead 39 would not be required. Next, upon command of the $f_c$ generator 30 the $K_P$ word from register 31 and the $N_P$ word from register 32 are communicated to adder 33 where the sum, after being sensed by ROM 34, is stored in register 32 while the predetermined word $K_P$ is returned via line 39 to the K register 31. This process continually repeats such that the number $K_{P-1}$ is always added to the same word $N_{P-1}$ of register 32 although the numerical value of the words in register 32 will obviously change after each addition.

The information which is transmitted to ROM 34 by the N bit register within adder 33 will first represent one step in a sawtooth wave, such as those illustrated in FIG. 2, for a first frequency, for example the frequency $f_c K_{P-1}/2^N$ while the next signal appearing in the register of adder 33 may represent a step in a frequency $f_c K_P/2^N$. Thus, P number of different frequencies may be generated by the circuit of FIG. 2 with the use of a single adder.

The circuit of FIG. 3, particularly the registers 31, 32, the adder 33 and the ROM 34 may be readily fabricated utilizing MOS technology. Dynamic memories may be utilized for registers 31 and 32. The advantage to the circuit of FIG. 3 is that in fabricating an MOS device the circuitry required to implement an adder such as adder 33 is far more complex than the circuitry required to implement a register such as registers 31 and 32.

Figure 4:
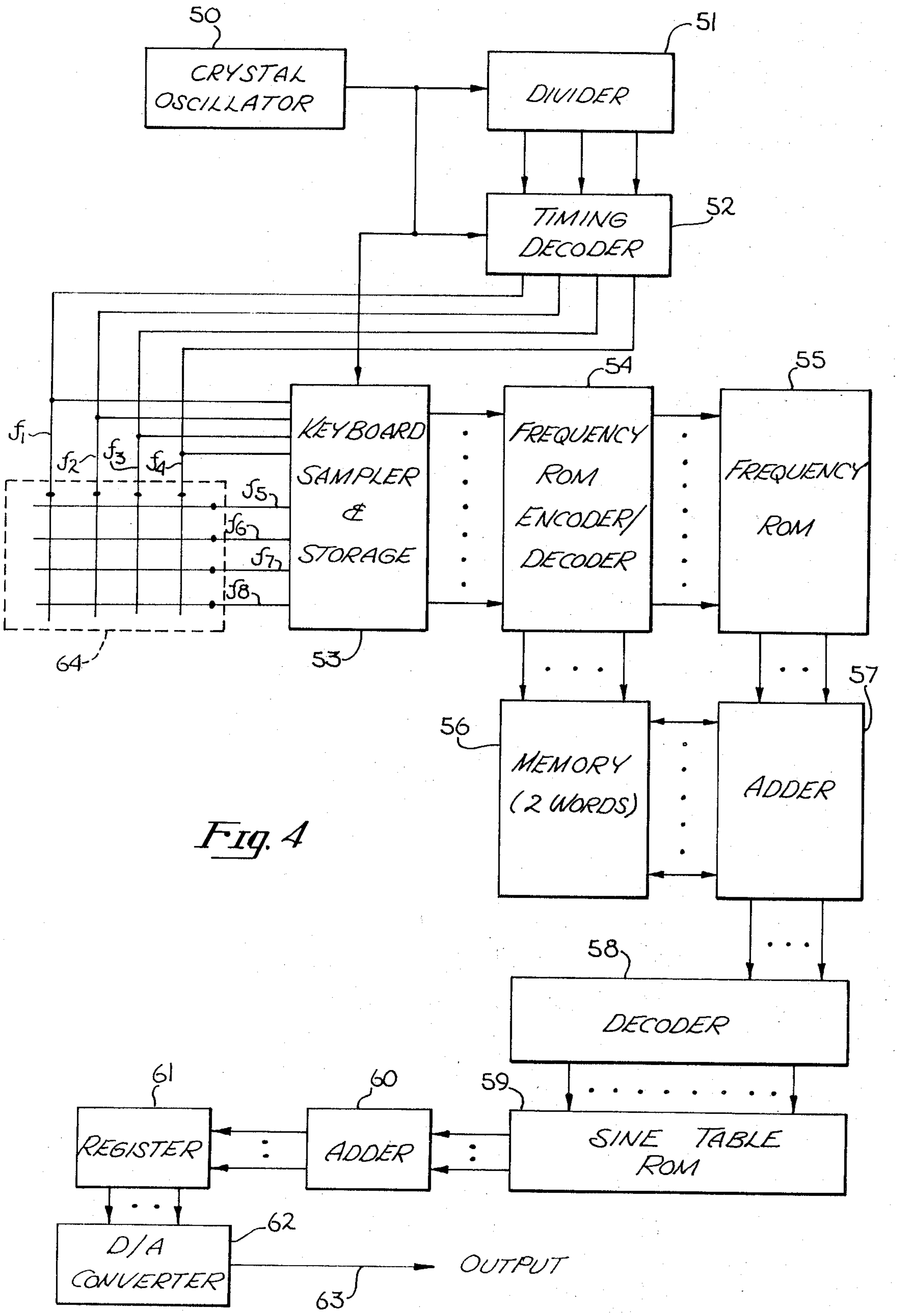
FIG. 4 is a block diagram of a touch tone dialer which embodies the concept of the present invention and which is used to generate two sinusodial functions.

Referring to FIG. 4, a circuit for a touch tone frequency generator which simultaneously generates two different frequencies when one of the sixteen keyboard positions is actuated as is shown. The circuit is designed to generate eight possible sinusodial signals, thus permitting 16 distinct pair of tones to be produced on the output lead 63, corresponding to 16 keyboard positions. While the description of the circuit of FIG. 4 involves a four-by-four keyboard, it will be readily apparent that other keyboards such as a four-by-three keyboard utilized on some push button telephones may be utilized with the circuitry disclosed in conjunction with FIG. 4.

The keyboard of the circuit of FIG. 4 is illustrated within dotted line 64 as four vertical lines designated as $f_1$ through $f_4$ and four horizontal lines designated as $f_5$ through $f_8$. The intersection of the vertical and horizontal lines, for the purposes of explanation, will be assumed to be the points at which a selection is made on the keyboard. Thus, if a manual selection is made at the intersection of the lines designated as $f_1$ and $f_8$ it will be assumed that the output on lead 63 will be a pair of tones $f_1$ and $f_8$. Likewise, if a manual selection is made at the intersection of the lines $f_4$ and $f_5$ a pair of tones will be produced at the output of lead 63 of frequencies $f_4$ and $f_5$. The keyboard shown within dotted line 64 may be any one of numerous keyboards built in accordance with known techniques.

As with the circuit of FIG. 1 a reference frequency $f_c$ is generated; divider 51 divides the output from the crystal oscillator 50 to a desired frequency. In the presently preferred embodiment the crystal oscillator is a 100 KHZ oscillator and divider 51 divides the 100 KHZ signal by eight. Timing decoder 52 is utilized to provide timing signals for the keyboard sampler and storage means 53 such that keyboard sampler and storage means 53 may scan the keyboard array 64 to determine which, if any, of the 16 possible positions have been selected.

The operation of the timing decoder 52 and the keyboard sampler and storage means 53 which in combination perform the function of scanning the keyboard array shown within dotted line 64 and which produce an output signal representative of the selected keyboard position will not be explained in detail herein since such devices are well known in the art. The frequency ROM encoder/decoder 54 may be ordinary logic circuitry which upon receipt of a signal from means 53 decodes that signal and encodes an appropriate signal so that the frequency ROM 55 will generate appropriate K values which correspond to the selected two frequencies. Frequency ROM 55 which corresponds to the K generator 14 of FIG. 1 has stored in its memory eight digital numbers which will be identified herein as $K_1$ through $K_8$. The frequency ROM 55 alternately supplies to adder 57 the two K values which correspond to the selected frequencies. For example, if the intersection of the lines designated as $f_1$ and $f_5$ had been selected, frequency ROM 55 would alternately couple to adder 57 K values $K_1$, $K_5$, $K_1$, $K_5$, etc. In the presently preferred embodiment frequency ROM 55 in a read-only-memory capable of storing eight words of from 12 to 14 bits each.

Memory 56 and adder 57 which together define an accumulation means perform a similar function as adder 33 and N register 32 of FIG. 3. The equivalent of the N bit register 16 of FIG. 1, as was the case in the circuit of FIG. 3, is included within adder 57 of FIG. 4. The N bit register included within adder 57 is coupled to decoder 58. As in the case of the previous embodiments adder 57 continually adds one K value to one stored number and a second K value to a second stored number. The results of each addition are coupled to an N bit register contained within adder 57 and are utilized by the decoder 58. The N bit register is allowed to overflow when the results of any addition exceeds the capacity of the N bit register, such that the most significant bit is lost as was done in the case of the circuits of FIGS. 1 and 3. In the presently preferred embodiment N is equal to 14 and hence the memory 56 must be capable of storing two-14 bit words.

Decoder 58 performs the function of sensing the contents in the N bit register and selecting or addressing a corresponding function in the sine table read-only-memory 59. In the presently preferred embodiment, the three most significant bits in the N bit register within adder 57 are coupled to decoder 58 and the output of decoder 58 comprises eight binary signals coupled to the sine table ROM 59. Within the sine table ROM 59 the appropriate value of a sinusodial function which corresponds to the number in the N bit register is selected and coupled to adder 60.

Adder 60 performs the function of adding successive pairs of signals from the sine table ROM 59 and coupling the sums of these additions to register 61. Hence adder 60 may be an ordinary adding means and register 60 may be an ordinary register commonly utilized in digital technology. The output from register 61 is coupled to a digital-to-analog converter 62, the output of which is lead 63. In the presently preferred embodiment the entire circuitry less the crystal contained within crystal oscillator 50 may be fabricated on a signal chip as an integrated circuit utilizing MOS technology.

The operation of the circuit of FIG. 4 is somewhat similar to the operation of the circuits illustrated in FIGS. 1 and 3. The adder 57 in conjunction with the memory 56 continually adds the appropriate K values to the appropriate word within memory 56 thus producing in the N bit register within adder 57 waveforms somewhat similar to the waveforms shown in FIG. 2. The output of adder 57 will first represent a portion of a sawtooth corresponding to the first selected frequency and next a portion of the sawtooth corresponding to the second selected frequency. The function of adder 60 is to add successive pairs of signals from ROM 59 so that the output on lead 63 will be a single signal which includes the two selected tones. By way of example, assume that frequencies $f_1$ and $f_5$ have been selected on the keyboard. The output from ROM 55 will be alternately digital numbers $K_1$ and $K_5$. These numbers will be alternately added to one of the two words stored within memory 56 and the accumulated sum will be utilized to address the appropriate sinusodial values in sine table ROM 59. Thus, for the example given, the output of ROM 59 will first be a value for $f_1$ followed by a value for $f_5$. These two values are added by adder 60 and after passing through register 61 are converted to an analog signal. The next signals from ROM 59 which will again correspond to the values for $f_1$ and $f_5$ are again added within adder 60 and then converted to an appropriate analog value by converter 62. This continues so that the two selected frequencies $f_1$ and $f_5$ will appear as two tones on lead 63.

The determination of the values of $K_1$ through $K_8$ may be made once the values of the desired frequencies $f_1$ through $f_8$ and the reference frequency have been determined in accordance with the equations previously discussed. For example the equation discussed in conjunction with FIG. 3 may be utilized where P is equal to 2 for the circuit of FIG. 4.

Thus, a frequency generator has been described which permits frequencies which are not necessarily submultiples of a reference frequency to be generated. The generator may be utilized in numerous applications including touch tone dialers, and for the synthesis of musical tones.

I claim:

1. A frequency generator for generating a plurality of different frequencies comprising:

digital means or sequentially providing P number of predetermined digital numbers;

addition means for adding two digital numbers, said addition means being coupled to said digital means;

storage means for storing at least P number of digital words, said storage means being coupled to said addition means such that each of said P words in said storage means is added to one of said predetermined digital numbers such that the most significant bits resulting from said addition which exceed a predetermined number of bits are deleted and the remaining bits stored in said storage means; and, timing means for controlling said additions;

whereby P number of different frequencies may be generated by said generator.

2. The generator defined by claim 1 including a read-only-memory such that the results of said additions are used as addresses for locating values which correspond to known functions.

3. The generator defined by claim 2 wherein said known function is a sine function.

4. The generator defined by claim 2 wherein the output from said read-only-memory is coupled to a digital-to-analog converter.

5. The generator defined by claim 1 wherein said storage means comprises a shift register.

6. The generator defined by claim 5 wherein said digital means comprises a shift register.

* * * * *